United States Patent [19]

Lotz

[11] Patent Number: 4,475,719

[45] Date of Patent: Oct. 9, 1984

[54] FLAME CUTTING MACHINE

[75] Inventor: Horst K. Lotz, Wiesbaden-Delkenheim, Fed. Rep. of Germany

[73] Assignee: Aute Gesellschaft fuer autogene Technik mbH, Zurich, Fed. Rep. of Germany

[21] Appl. No.: 563,352

[22] Filed: Dec. 20, 1983

[30] Foreign Application Priority Data

Jan. 7, 1983 [DE] Fed. Rep. of Germany ....... 8300198

[51] Int. Cl.³ .............................................. B23K 7/02
[52] U.S. Cl. ....................................... 266/48; 266/49; 266/50
[58] Field of Search .............................. 266/48, 49, 50

[56] References Cited

U.S. PATENT DOCUMENTS

| 4,143,860 | 3/1979 | Herbener et al. | 266/49 |
| 4,172,586 | 10/1979 | Schmitt | 266/50 |
| 4,235,422 | 11/1980 | Schmunck et al. | 266/50 |
| 4,261,552 | 4/1981 | Kameyama et al. | 266/50 |

Primary Examiner—W. Stallard
Attorney, Agent, or Firm—Gifford, Van Ophem, Sheridan, Sprinkle and Nabozny

[57] ABSTRACT

A flame cutting machine for cutting a workpiece comprises at least one cutting torch which is movable transversely with respect to the workpiece feed direction and which is adjustable in respect of operating height. Operatively associated with the torch is a length measuring means for measuring the relative movement as between the machine and the workpiece, to measure a given length of workpiece to be severed. The measuring means includes a measuring wheel which runs against the surface of the workpiece. The machine has a vertically movable support plate which on its front or upstream side, carries a sound and heating insulating hood, within which the tip of the torch is disposed. The measuring wheel is arranged on the rearward or downstream side of the support plate. Cooling systems are provided in various forms, together with a simplified system for feeding gas to the torch.

26 Claims, 11 Drawing Figures

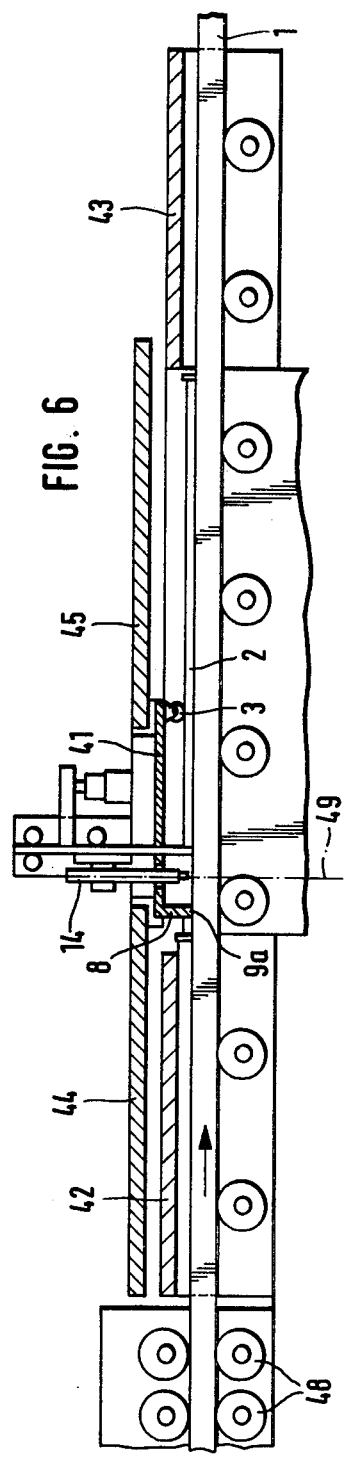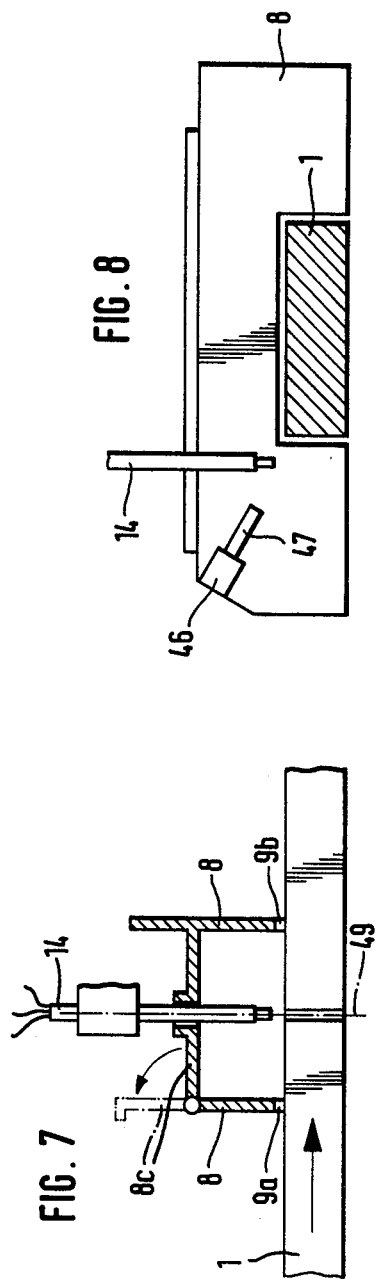

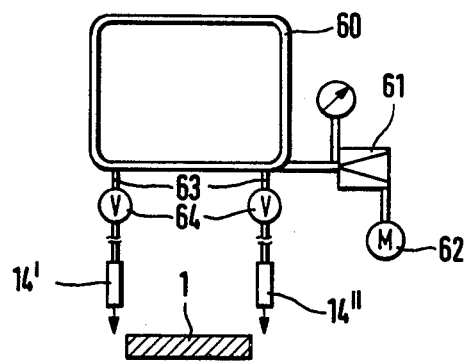

FLAME CUTTING MACHINE

BACKGROUND OF THE INVENTION

The present invention relates generally to a flame cutting machine and more particularly to a flame cutting machine for cutting sections accurately from a workpiece such as a cast or rolled length of steel.

In one form of flame cutting machine for cutting a workpiece comprising for example steel, which is disposed on a roller bed conveyor or a table, into portions of accurate lengths, a cutting torch is movable transversely with respect to the direction of feed movement of the workpiece and is adjustable in respect of its working height. Associated with the cutting torch is a length measuring arrangement for measuring the relative distance covered as between the flame cutting machine and the workpiece, using for that purpose a measuring wheel which runs against the surface of the workpiece as it moves.

Such a flame cutting machine suffers from various kinds of linked difficulties. Thus, it is necessary on the one hand to provide thermal insulation for various parts of the flame cutting machine, in particular the feed hoses and cables, and other units which are sensitive to heat such as the measuring rollers. In addition, there is a need for the slabs or blooms which are cut off by the machine to be severed from the workpiece, which may be, for example, a continuously cast or rolled workpiece, while in the condition of having been cooled down to the minimum extent; it is thus necessary to avoid cooling as far as possible, in which respect other kinds of problems occur, in connection with cooling the machine.

SUMMARY OF THE INVENTION

An object of the present invention is to provide a flame cutting machine which does not suffer from the disadvantages of the above-indicated machines.

Another object of the present invention is to provide a flame cutting machine which has adequate thermal insulation and also sound insulation while being of an inexpensive design structure and satisfactory in operation from the technical and economic point of view.

Yet another object of the present invention is to provide a flame cutting machine which meets the conflicting requirements for satisfactory cooling of heat-sensitive parts of the machine, and maintaining the material to be cut at its suitably elevated temperature.

These and other objects are achieved by a flame machining or cutting machine, with a sound-proofing and insulating hood, for example for cutting portions of accurate length from, for example a steel workpiece disposed on a table or on a roller bed, by means of at least one cutting torch which is movable transversely with respect to the feed direction of the workpiece and which is adjustable in respect of its working height. Associated with the cutting torch is a length measuring means for measuring the relative movement as between the flame cutting machine and the workpiece, by means of a measuring wheel which runs on the surface of the workpiece to measure off a length of material to be severed. The machine also includes a lift support plate which, on its front or upstream side, carries a protective hood which, upon being lowered, comes to lie on the workpiece, together with the lift plate. The cutting torch or torches, the tip of which is within the hood, is or are mounted on the lift plate, above the protective hood, together with motion means for moving the torch or torches. Other heat-sensitive units of the machine are disposed outside the sound-proofing and insulating hood.

In an advantageous embodiment of the machine according to the invention, the protective hood is flat or shallow and of a substantially overhung or cantilevered configuration, in order to protect the torch motion means and any cables and supply hoses which may be hanging down unprotectedly for example in the center of the machine, from the direct radiation of heat or from hot air rising from the workpiece. The hood may be provided with lateral enclosure wall portions which project downwardly beyond the level at which the surface of the workpiece is disposed, in operation of the machine, substantially as far as the rollers or other support means which carry the workpiece, the enclosure wall portions being disposed as closely as possible to the sides of the roller bed conveyor or other support table, in order to overlap therewith.

In another advantageous embodiment, an entrainment action in order to produce a synchronous movement of the torch assembly with the workpiece, if such is required, may be produced by the lift plate and the underside of the hood being provided with members which are adapted to come to lie against the surface of the workpiece and which jointly or individually produce a frictional contact effect, such that the workpiece satisfactorily entrains the hood and torch assembly.

In such an arrangement, the spacing of the lower edge of the lift plate from the hood desirably ensures that the nozzle or tip of the torch is at the correct spacing from the workpiece.

In another advantageous embodiment of a flame cutting machine, the torch is guided through a motion slot or opening which is provided in the top wall or panel portion of the hood, extending in a direction which is transverse with respect to the direction of forward feed movement of the workpiece. The motion slot is preferably of an extremely narrow configuration, that is to say, is of the minimum transverse dimension consistent with the shaft or shank portion of the torch extending therethrough, so as to leave the minimum clearance between the sides of the slot and the torch. At the sides of the slot are provided high guide means, for example about five to seven times the width of the slot.

In another embodiment in accordance with the principles of this invention, disposed on the rearward or downstream side of the lift plate, in relation to the direction of feed movement of the workpiece through the machine, is a measuring roller or wheel. The roller or wheel is secured to a pivotally mounted lever assembly which, besides the measuring roller or wheel, also carries cooling discs or wheels which are disposed beside the measuring roller or wheel and which rotate in a cooling bath, for example of water.

In accordance with a preferred feature of the invention, the torch or torches is or are arranged at the end of the flame cutting machine which is towards the incoming workpiece, and the workpiece is engaged or clamped by the hood configuration preferably upstream of the line of cut produced by the torch or torches, as viewing in the direction of movement of the workpiece through the machine.

In accordance with another feature of the invention, the hood means may constitute part of a telescopically interengageable insulating duct system, with the insulating duct comprising a fixed bottom structure or subconstruction having side walls; only an insulating cover member or a suitable shutter-like means passes over the side walls, with the cutting torch. The insulating duct, with the hood configuration, provides a sealing or barrier action in regard to the transfer of heat and noise. The top portion of the hood configuration is preferably removable, for inspection purposes.

In another advantageous feature of the present invention, there is a monitoring system comprising a camera having a water-cooled housing and viewing hood or tube, which passes through the insulating hood configuration. A respective camera may be arranged on each side of the assembly, for monitoring viewing purposes.

In a modified embodiment of the flame cutting machine which comprises a plurality of cutting torches, a separate ring main or conduit is provided for each medium or agent to be supplied to the cutting torches, such as cutting oxygen, heating oxygen and heating gas. Supply conduits for the individual torches are connected to the main conduit, to supply those torches with the respective agents required. A joint control means is provided in the feed line or conduit which feeds the main conduit, to provide control in respect of the feed to the various torches. The supply conduits to the torches include highspeed vent valves between the main conduit and the torches, which valves are preferably disposed directly at the locations at which the supply conduits to the torches issue from the main conduit. The gas feed conduits for the main conduit and the control board with the associating control means are preferably so adapted that they can be mounted selectively on the right or on the left of the workpiece to be cut.

Further features for the purposes of cooling, in accordance with the principles of this invention, provide that the machine has a cooling jacket or casing having an open intake connection into which cooling water flows from a cooling water feed conduit. Cooling water leaves the chamber defined by the cooling jacket or casing, through an open discharge means. The open machine cooling system also includes the torch cooling arrangement, by virtue of the water issuing from the cooling jacket or casing by way of the ducts or conduits for cooling the torch. The flow of cooling water is preferably regulated by suitable cross-section means, and the cooling water cavities or chambers ensure that there is a minimum reserve of coolant so that the machine can be reliably protected from overheating in the event of a temporary interruption in the main feed of cooling water thereto.

Further objects, features and advantages of the present invention will be apparent from the following description of preferred embodiments, with reference to the accompanying drawings.

BRIEF DESCRIPTION OF THE DRAWINGS

FIG. 6 shows a further embodiment of a flame cutting machine, FIG. 7 shows an insulating hood assembly with removable top portion, FIG. 8 shows an insulating hood with a camera, FIG. 9 shows a diagrammatic view of an open cooling system of a flame cutting machine, FIG. 10 shows a torch which is incorporated in the cooling system shown in FIG. 9, and FIG. 11 is a diagrammatic view of a ring main or conduit for a flame cutting machine having two cutting torches.

DESCRIPTION OF PREFERRED EMBODIMENTS

Figure 1:
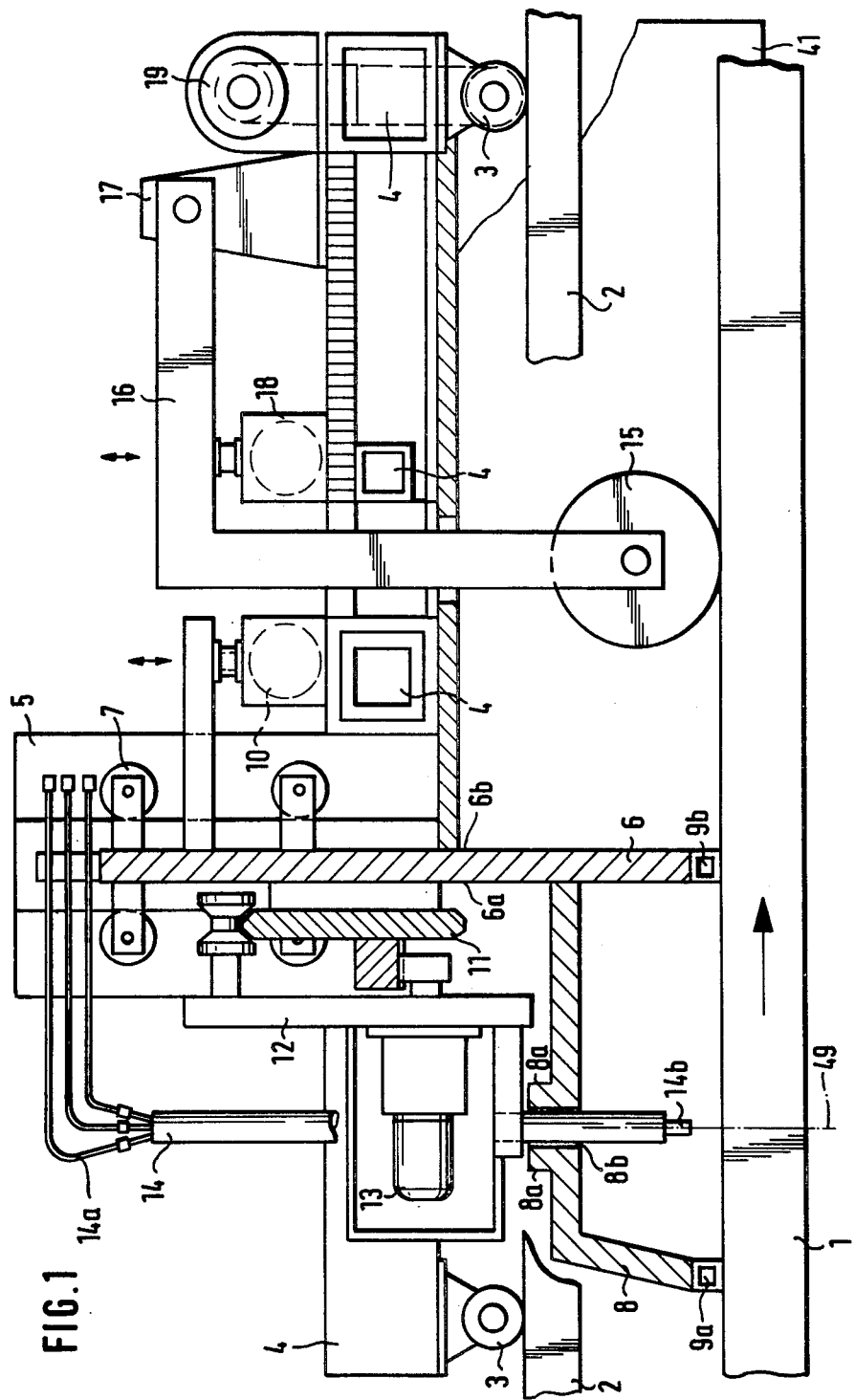
FIG. 1 shows a partly sectional view of a flame cutting machine with lift plate member and protective hood.

Reference will now first be made to FIG. 1 showing in generally diagrammatic form a flame cutting machine, on a workpiece 1 which is in the form of an elongate member comprising, for example, steel, being, for example, in the form of a continuous casting or the like. The flame cutting machine is movable along the workpiece 1 on rails 2, being supported thereon by means of wheels or rollers 3. As can be seen from FIG. 1, the flame cutting machine comprises a main or basic construction or support assembly which is formed by frame members, of which various parts are indicated by reference numerals 4 in FIG. 1. A lift plate 6 is mounted to the main frame structure, by way of a lift guide and mounting assembly 5. The plate 6 can thus be moved upwardly and downwardly relative to the workpiece 1, in an at least substantially vertical direction, being supported and guided in such movement by means of rollers or wheels indicated at 7. The plate 1 carries a hood configuration which is generally indicated by reference numeral 8, for sound proofing and thermal insulation purposes. The hood 8 is of a generally flat or shallow configuration and is carried in a cantilever or overhung relationship by the plate 6. The lower edge of the hood 8 carries a suitable member indicated at 9a, for coming into contact with the workpiece 1 at the upper surface thereof, and the lower edge of the plate 6 similarly has such a member as indicated at 9b, which is also arranged to come into contact with the upper surface of the workpiece 1. That arrangement permits the flame cutting machine to be set down into contact with the top surface of the workpiece 1 in such a way that the frictional contact between the members 9a and 9b and the upper surface of the workpiece 1 causes the flame cutting machine to be entrained with the workpiece 1 as it moves along, in order to provide for synchronous movement of the workpiece and the machine, as may be required in some situations of use.

It will be seen from the foregoing description and the illustration in FIG. 1 that the hood 8 provides for sound proofing and thermal protection or insulation so that one or more cutting torches which operate on the workpiece 1 within the confines of the hood 8 are protected in a highly satisfactory manner from the space around the hood, thus ensuring environmental protection as well as giving protection to operating personnel who may be in the vicinity of the cutting torch. Furthermore, the parts of the flame cutting machine which are arranged above the hood 8 are thereby protected from the heat which radiates and rises from the workpiece 1. It should be appreciated that the members 9a and 9b at the lower edges of the lift plate 6 and the hood 8 ensure that the tip or nozzle 14b of the cutting torch 14 is held at the correct spacing from the workpiece 1.

In order further to improve the protection and insulation effects afforded by the hood 8, the hood 8 is provided with lateral enclosure walls which project downwardly beyond the upper surface at least of the workpiece 1, as far as the side portions of the rollers or like members supporting the workpiece 1 during the cutting operation, preferably as closely as possible to those side portions, in order to overlap therewith.

In order further to provide thermal protection in regard to parts of the cutting torch or torches which may be susceptible to heat rising from the workpiece, for example a cutting drive or actuating means as indicated diagrammatically at 13 in FIG. 1, together with supply hoses and cables 14a, the cutting torch 14 is so disposed as to extend through a slot 8b which is provided in the top plate or panel portion constituting the roof or cover of the hood 8. The slot 8b extends in a direction which is transverse with respect to the direction of feed movement of the workpiece 1, as indicated by the arrow illustrated therein. The torch 14 is thus displaceable in the slot 8b, for cutting movement. The slot 8b is preferably extremely narrow, that is to say, its width is larger than the corresponding widthwise dimension of the torch 14 by the minimum reasonable amount, so as to leave the smallest possible clearances between the side wall surfaces of the slot and the side surfaces of the torch at the position where it passes through the slot. The width of the slot may be for example about 15 to 30 millimeters. At each side of the slot 8b, the upper or roof portion of the hood 8 has high guide portions 8a which may be for example from 75 to 300 millimeters in height. In general, the height of the guide portions 8a may be for example from about 5 to 7 times the width of the slot 8b. In that way, the entire torch-carrying carriage or assembly 12 with the cutting drive means 13 and the torch 14 thereon, together with the cables and hoses as indicated at 14a, which hang down in a generally unprotected manner, are adequately protected from direct heat radiation or rising hot air from the workpiece 1, in spite of the opening in the top or roof portion of the hood 8. It will be seen from FIG. 1 that the carriage 12 is movably supported on a rail-like assembly diagrammatically indicated at 11, to permit the torch to be displaced transversely with respect to the workpiece 1.

The lift plate 6 is displaced towards and away from the workpiece 1, by a suitable actuating means indicated at 10 in FIG. 1.

While the cutting torch assembly 12 through 14 and the hood 8 are disposed at the front or upstream side 6a of the lift plate 1, as considered in the direction of movement of the workpiece, a length measuring means indicated generally by references 15 and 16 is disposed on the rear or downstream side 6b of the lift plate 6. By virtue of the protection afforded by the plate 6, a measuring roller or wheel 15 which forms part of the length measuring means and which rolls against the top surface of the workpiece 1 in operation of the machine can be safely disposed closely adjacent to the plate 6 and therefore also closely adjacent to the nozzle or tip 14b of the torch 14. After the protective plate 6 has been lowered into the position illustrated in FIG. 1, in which it encloses the torch tip 14b and bears against the upper surface of the workpiece 1, by actuation of the drive assemblies 10 and 11, the area or space at the downstream side of the rear surface 6b of the plate 6 is protected from the cutting operation, and the roller or wheel 15 can be lowered on to the upper surface of the workpiece 1 by a stroke actuating means 18 forming part of the length measuring assembly. The arrangement can then be moved synchronously with the workpiece 1 as it moves in the direction indicated by the arrow, either by way of an operating drive means 19 which acts for example to drive one or more of the support rollers 3 of the flame cutting machine, or by means of frictional engagement between the upper surface of the workpiece 1 and one or more of the contact members 9a, 9b.

Figure 2:
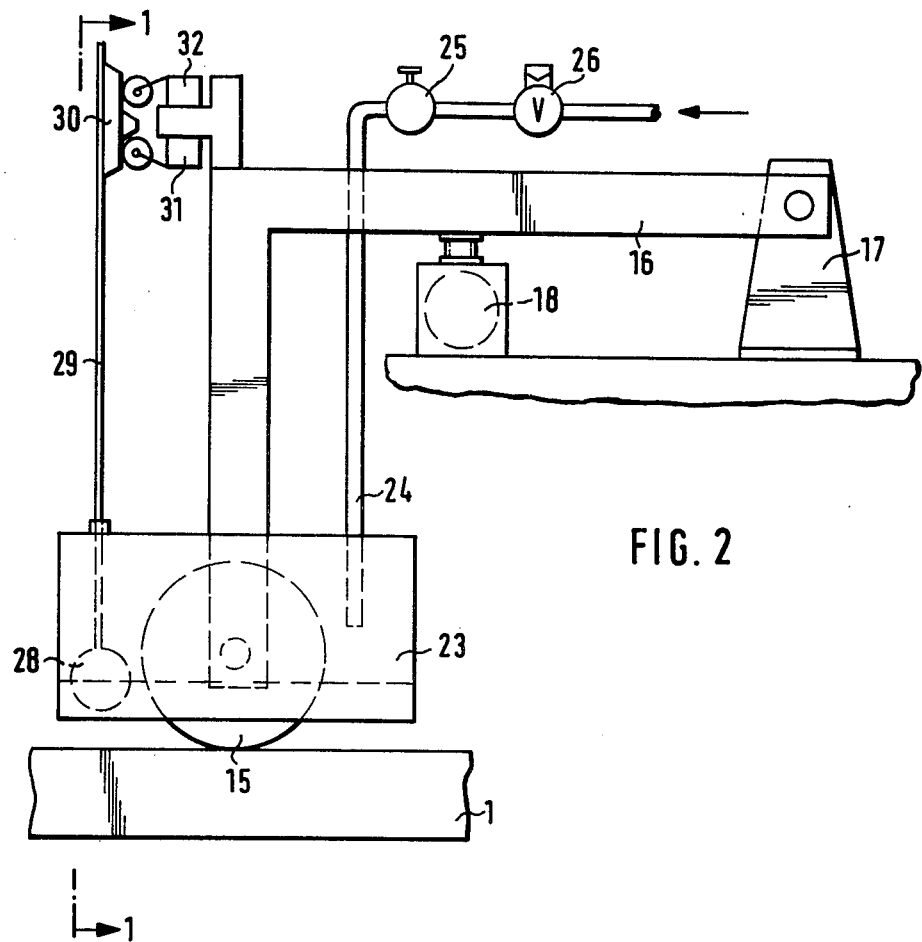
FIG. 2 shows detail features of a length measuring means of the machine shown in FIG. 1.
Figure 3:
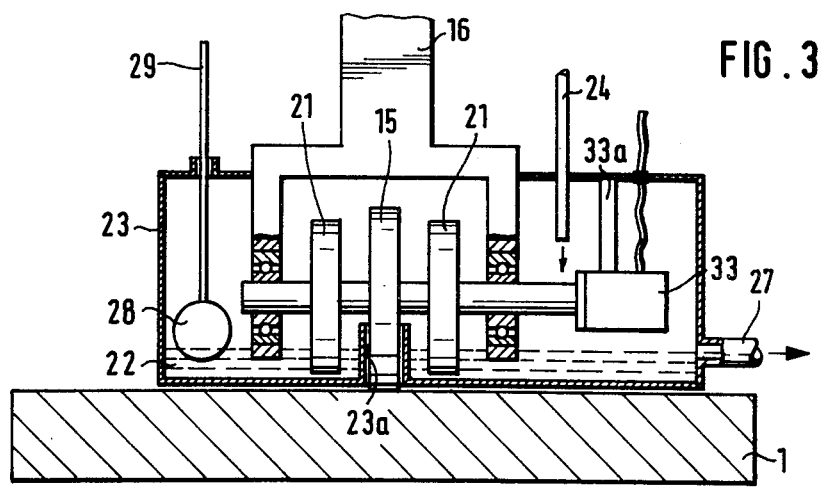
FIG. 3 shows a view of a measuring roller or wheel of the FIG. 2 arrangement, in cross-section taken along line 1—1 in FIG. 2.

Reference will now additionally be made to FIGS. 2 and 3, which show that the measuring roller or wheel 15 is secured to a lever, illustrated in the form of an angle or elbow lever 16 which is pivotally mounted on a suitable support member 17. Thus, the substantially vertical limb or leg of the lever 16 carries the measuring roller 15 at a position adjacent the lower end thereof. FIG. 3 shows a fork configuration at the lower end of the lever 16, with the measuring roller 15 being carried on a spindle suitably journalled in the limbs of the fork configuration. As FIG. 3 also shows, disposed on respective sides of the measuring roller 15 are cooling discs or wheels 21 which are thus rotatable as a unit with the measuring roller 15. Each disc 21 is so arranged as to dip into a respective bath 22 of suitable coolant such as water, the lower portion of each disc 21 thus being immersed in the cooling water. Each portion of the cooling water bath is disposed in a cooling box or tank indicated generally by 23, which is secured by suitable means (not shown) to the lever 16 and which, in its bottom or underside, has a slot 23a through which the measuring roller 15 extends downwardly to contact the workpiece 1. It will be noted that the measuring roller 15 is of larger diameter than the cooling discs 21. The tank 23 is provided with a water supply pipe 24 which includes an adjusting tap or cock 25 and an electromagnetically operated valve 26, as shown in FIG. 2. The illustrated arrangement provides for a regularly controlled feed flow of cooling water to the tank 23, by way of a limit switch system. For that purpose, a water outlet pipe 27 is disposed in the side of the tank 23, at a given position such as to maintain a suitable, substantially constant level of water in the tank 23, together with a float 28 carrying a float rod 29, to control the inflow of water.

As shown in particular in FIG. 2, the rod 29 is provided with a cam member 30, while operatively associated with the cam member 30 is a limit switch 31 and a further limit switch 32. Thus, when the level of water in the tank 23 drops to an excessively low level, the cam 30 will actuate the limit switch 31 which in turn will operate the valve 26 to provide for an additional amount of water to flow through the pipe 24 into the tank 23 until the appropriate level is reached. In the event of the level of water in the tank 23 exceeding the predetermined level, for some reason such as a blockage of the outlet 27, then the cam 30 actuates the limit switch 32 to completely cut off the flow of water into the tank 23, for example until the level of cooling water therein is returned to the correct level.

Referring now again to FIG. 3, it will be seen that a pulse generator 33 which is operatively connected to the shaft carrying the measuring roller 15 and the cooling discs 21 is carried by a suitable holder 33a within the water tank 23, being suitably protected thereby.

It will be seen from the foregoing description therefore that, by virtue of the sound-insulating and heat-insulating hood 8, the cutting torch or torches can be arranged in a position just closely upstream of the measuring wheel or roller 15 of the length measuring means, while the illustrated configuration of the plate 6 and the hood 8 with the respective contact members 9a and 9b thereon provides that the hood 8 and the plate 6 can engage the workpiece on respective sides of the cut formed by the cutting torch 14.

Figure 4:
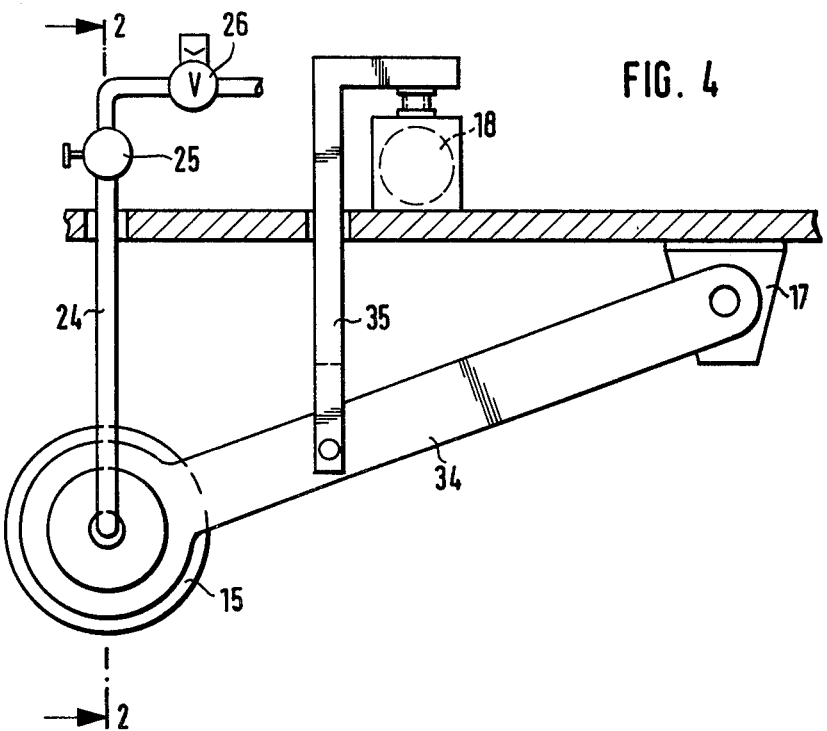
FIG. 4 shows a modified embodiment of a length measuring means.
Figure 5:
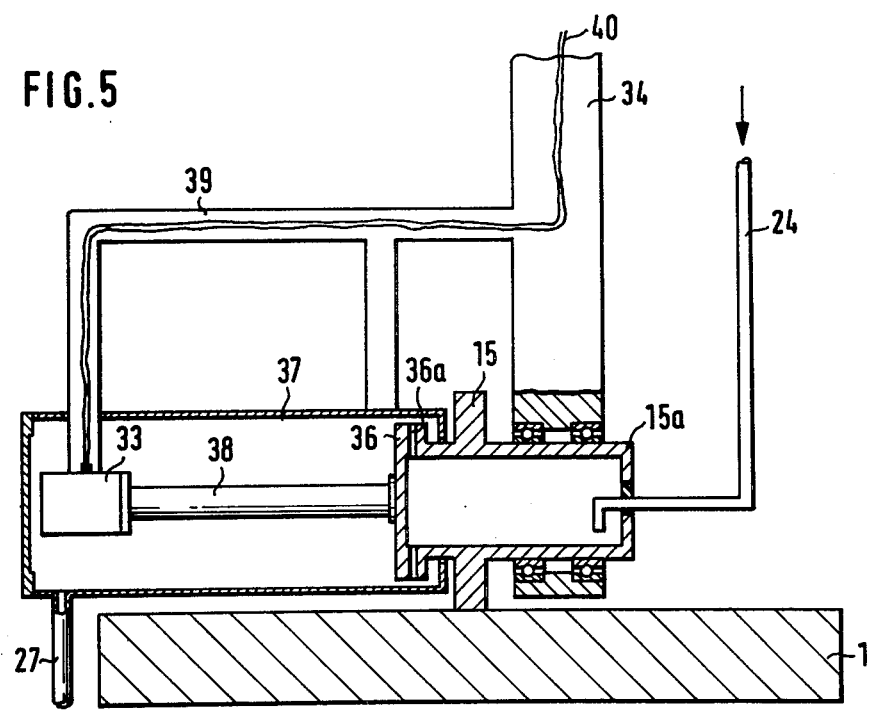
FIG. 5 shows a view of a measuring roller or wheel assembly in section taken along line 2—2 in FIG. 4.

Reference will now be made to FIGS. 4 and 5 showing a modified form of a length measuring means suitable for use in a flame cutting machine of the general kind described hereinbefore with reference to FIGS. 1 through 3. In view of the resemblance and relationship between the constructions shown in FIGS. 1 through 3, and FIGS. 4 and 5 respectively, the same reference numerals are used in FIGS. 4 and 5, to denote the same components as those illustrated in FIGS. 1 through 3. Looking therefore at FIG. 4, the measuring roller or wheel 15 in this construction is secured to a substantially straight lever 34 which once again is pivotally mounted at one end thereof on a suitable mounting means 17. The measuring roller 15 is carried on the other end of the lever 34, remote from the mounting means 17. Pivotally connected to the lever 34 intermediate its ends is an actuating member in the form of a rod or arm 35 which in turn is operatively connected to the actuating means 18 for lifting the measuring roller 15 away from the workpiece 1, and returning it into contact therewith as required. In this embodiment also, the water feed pipe 24 has an adjusting cock 25 and an electromagnetically operated valve 26. However, unlike the embodiment described above with particular reference to FIGS. 1 and 2, the construction of the length measuring arrangement shown in FIGS. 4 and 5 provides that the measuring roller 15 has a hollow shaft 15a, as can be clearly seen from FIG. 5. The shaft 15a is journalled in the end of the lever 34 and the water supply pipe 24 opens axially into the hollow shaft 15a. Disposed at the end remote from the end of the hollow shaft 15a at which the water supply pipe 24 opens thereinto, there is a cooling water discharge flow disc 36. The cooling water discharge disc 36 has discharge passages or ducts 36a which extend substantially radially thereof and which feed the water that is introduced into the hollow shaft 15a from the pipe 24 into the cooling water collecting box or tank 37. The box or tank 37 is supported by the lever 34 at the side thereof, and has a water outlet or discharge 27, at the side of the workpiece 1. It will be seen, therefore, that cooling water introduced into the hollow shaft 15a passes through the shaft 15a and is discharged by way of the radial ducts 36a into the tank 37 from which it is then discharged at the outlet 27, thus providing for a continuous flow of coolant through the measuring wheel assembly 15, 15a.

FIG. 5 also shows that the shaft 15a of the measuring wheel 15 is connected to a pulse generator shaft 38 which in turn is operable to drive the pulse generator 33. The pulse generator 33 is secured by suitable mounting means to the support assembly 39 for carrying the tank 37, with the signalling wires 40 also extending through the arrangement 39, as illustrated.

Reference will now be made to FIG. 6 which is a diagrammatic view of a flame cutting machine, on a smaller scale than the preceding Figures. In FIG. 6, reference numeral 1 denotes a workpiece which is to be cut into accurately defined lengths, such as for example a continuously cast member or the like. The workpiece 1 is displaced through the equipment from left to right in FIG. 6, as illustrated by the arrow thereon, being supported on a suitable form of conveyor such as a roller bed or table. Supported above the workpiece 1 is the flame cutting machine which is supported by means of wheels or rollers 3 on a suitable track arrangement 2, only a portion of which is illustrated. At the upstream end of the illustrated piece of equipment, being at the left-hand side in FIG. 6, is a drive straightening roll stand having rollers 48 which displace the workpiece 1 towards the right in FIG. 6. The flame cutting machine comprises at least one cutting torch as indicated by reference numeral 14 which is arranged on the side of the flame cutting machine that is towards the incoming workpiece 1, that is to say, on the upstream side of the flame cutting machine. So that the flame cutting machine moves synchronously with the moving workpiece while a flame cutting severing action is produced to cut the workpiece 1 into the appropriate lengths, the flame cutting machine is in driving contact therewith, by means of a suitable clamping or contact member 9a which is, therefore, basically similar to the corresponding member 9a shown in FIG. 1. As viewed in the direction of movement of the workpiece 1 through the equipment, the contact member 9a is disposed upstream of the line of cut 49 produced by the cutting torch 14. The member 9a is carried by the hood 8 which in turn is carried by the flame cutting machine 1, in generally the same manner as described above, for example, with reference to FIG. 1. Thus, the member 9a again forms or is carried by the lower edge of the front or upstream wall portion of the hood 8. The hood 8 is arranged in the lower region of the flame cutting machine, together with an insulating cover portion 41. The hood configuration comprising the components 8 and 41 in turn forms a part of a telescopically interengageable insulating duct system 42 through 45. The duct system comprises a stationary duct portion 42 which is disposed between the roll stand 48 and the flame cutting machine, when the latter is in its most upstream position, relative to the direction of travel of the workpiece 1, and another stationary duct portion 43 which extends over and, therefore, covers the discharge roll bed or table and which begins at the location at which the flame cutting machine is disposed, when in its most downstream position. The stationary channel portions 42 and 43, of which FIG. 6 only shows the top or cover parts in section, also include side wall portions which, therefore, also extend over the region in which the flame cutting machine reciprocates on its track arrangement 2. Insulating cover members 44 and 45 which also form part of the insulating duct or channel system are suitably secured to the flame cutting machine, as can be seen from FIG. 6. The members 44 and 45 are displaced in a telescopic fashion over the stationary portions 42 and 43, as the flame cutting machine reciprocates on its track arrangement 2.

The above-described arrangement as illustrated in FIG. 6 not only provides for optimum heat insulation, by virtue of the co-operation of the members 42 through 45 which thus define what might be called a channel or duct through which the workpiece passes and within which the flame cutting machine is at least for a substantial part enclosed, but the illustrated arrangement also provides a sealing or barrier effect in respect of noise as the insulating channel system provided prevents either heat or noise from escaping in a downward direction, except through the cuts formed by the torch, or laterally through other major clearances.

Referring now to FIG. 7, shown therein on an enlarged scale is the enclosing hood 8 which, as described above, carries contact members 9a and 9b with which it comes into contact with the workpiece 1. In order to be able to observe and check the burner 14, the top or roof portion 8c of the hood 8 can be removed by a pivoting movement, as shown in broken lines in FIG. 7. Although the portion 8c is pivotally mounted in the illustrated construction, other modes of permitting the portion 8c to be removed for inspecting the interior of the hood 8 can obviously also be envisaged.

FIG. 8 shows another possible arrangement for monitoring the interior of the hood, by the provision of a remote monitoring system comprising a camera 46 having a water-cooled housing and viewing tube 47. The tube 47 passes through the hood 8 and thus permits the interior of the space defined by the hood 8, including therefore the torch 14 and also the workpiece 1, to be suitably observed and monitored. A respective camera may be mounted on each side of the hood, or at other locations as required.

Such arrangements permit a flame cutting operation to be carried out in the optimum manner from the point of view of energy consumption, without giving rise to the fear of breakdowns or failures in operation by virtue of discharge of the bloom or slab, for example when carrying out a flame cutting operation for trimming or scarfing off the top of a workpiece 1.

Various systems for cooling parts of the flame cutting machine have been described hereinbefore, with reference for example to FIG. 3 and FIG. 5. FIG. 9 now shows a diagrammatic view of an advantageous form of cooling system for the flame cutting machine. The illustrated system is an open machine cooling system wherein the flame cutting machine which is only diagrammatically indicated generally by reference numeral 50 has a double jacket or casing 51. Cooling water is caused to flow through the double casing or jacket 51, insofar as the discharge end 53 of a coolant supply conduit 54 opens into an open feed end portion or connection 52 of the double casing or jacket 51. The conduit 54 has a shut-off valve 55 thereon, to shut off the supply of water into the open cooling system 51. The illustrated arrangement has the advantage that there is no necessity for special complicated arrangements with consequent costs for the coolant supply, insofar as a normal or standard water pipe with shut-off valve 55 supplies the double casing or jacket 51 of the machine 50 with cooling water. The lower portion of the cooling jacket or casing 51, and, therefore, also the associated wall portion of the flame cutting machine 50, is of a curved configuration in order to facilitate the flow of cooling water from the intake at 52 through the double casing or jacket 51 to the coolant outlet 56.

Other units and assemblies may be connected to the open cooling system of the flame cutting machine. FIG. 10, therefore, shows a torch 14 which is integrated into the flame cutting machine cooling system, that is to say, the coolant also flows through the torch 14 and is discharged by way of a discharge connection 57 which is secured to the torch 14 by a suitable holder 58. In the illustrated arrangement, the discharge opening for the discharge of coolant from the open machine cooling system may be so arranged that other important components, which are disposed outside the flame cutting machine, for example in the roller bed or table, can also be cooled thereby.

By virtue of the machine cooling system illustrated in FIGS. 9 and 10, it is possible for the flow of cooling water to be regulated for example in the cooling jacket 51 by means of suitable cross-sections, so that the flow of cooling water is suitably matched or adapted to the cooling requirement of the machine. Likewise, the coolant chambers or spaces defined by the cooling system are of such dimensions as to ensure that there is a minimum reserve level of coolant in the system so that, in the event of a temporary failure in the supply of cooling water, the flame cutting machine and any other units or assemblies which are possibly operationally associated therewith are nonetheless still adequately protected and cooled.

Reference is now made to FIG. 11 which is also a diagrammatic view of another flame cutting machine which is provided with a plurality of and more particularly two torches 14' and 14''. To give an example in this connection, use is made of two torches 14' and 14'' which operate in opposition to each other in order to sever a very wide workpiece 1. The arrangement illustrated in FIG. 11 includes a ring main or conduit 60 for supplying the various operating agents, for example heating gas, heating oxygen and cutting oxygen, which are required for operating the torches 14' and 14''. The provision of the conduit 60 means that there is no need to have separate control units for each of the torches 14' and 14'', insofar as the system only requires one controller 61 which is actuated by a control motor 62 by way of a remote control assembly (not shown). Thus, the two torches 14' and 14'' are controlled jointly by way of the controller 61, with the ring conduit 60.

For the purposes of carrying out a flame machining operation such as an operation which is sometimes referred to as a refining cutting operation, which involves immediately interrupting operation of a torch at given times, a cutting oxygen supply conduit 63 illustrated as part of the FIG. 11 system includes a high-speed venting valve 64 which immediately empties the conduit 63 when the system is shut down, so that torch operation is stopped instantaneously. While FIG. 11 illustrates only one ring conduit for the cutting oxygen feed, ring conduits are also required for the other cutting agents, as referred to above, being heating oxygen and heating gas, so that, besides making a saving on controllers and control motors, the illustrated arrangement also provides for economical remote control and automation, by means of using the ring conduits. The controllers with their remote control units may be positioned on the left or on the right of the flame cutting machine, in accordance with structural and other design factors which must be taken into consideration.

Another advantage of the arrangement illustrated in FIG. 11 is that the valves 64 are preferably disposed directly at the locations at which the supply conduits 63 are connected to the ring conduit 60, thereby giving greater ease of maintenance and similar operations.

In an advantageous form of the FIG. 11 arrangement, the conduits 60 may also be integrated into the frame structure of the machine, which therefore provides for a tidy design.

It will be appreciated from the foregoing description that the above-described machines are of such a design as to ensure optimum operation, from a technical and economic point of view, while being of low design cost.

It will also be appreciated that the foregoing constructions have been described only by way of illustration and example, and that various alterations and modifications and substitution of parts may be made therein without thereby departing from the spirit and scope of the present invention.

What is claimed is:

1. A flame cutting machine for cutting a workpiece, comprising: at least one torch having an operating end portion; means for moving said torch transversely with respect to the workpiece feed direction; a length of measuring means for measuring a relative travel as between the torch and the workpiece, including a rotary measuring member adapted to run on a surface of the workpiece; a support plate having an upstream side and a downstream side with respect to the workpiece feed direction; means for movably mounting said support plate; means for moving said support plate towards and away from a said workpiece; and a hood means carried by said support plate on its said upstream side and adapted to co-operate with said workpiece to define an enclosure at least for said operating end portion of said torch, thereby to protect heat-sensitive components of said machine from heat originating within said hood means.

2. A machine as set forth in claim 1 wherein means for moving said torch is mounted on said support plate outside said hood means.

3. A machine as set forth in claim 1 wherein said hood means is mounted in an at least substantially overhung relationship on said support plate and includes side enclosure portions which in a lowered operative position of said hood means project downwardly beyond the surface of the workpiece to provide also for lateral enclosure of the portion of workpiece being operated on.

4. A machine as set forth in claim 3 and further including a workpiece support and feed means comprising a feed roller array, wherein said lateral enclosure portions are disposed to extend closely adjacent to the rollers of said roller array, thereby to overlap therewith.

5. A machine as set forth in claim 1 wherein at least one of said support plate and said hood means has a lower edge portion bearing a contact member adapted to bear against said workpiece in the lowered operative position of said support plate and hood means, thereby to be in frictional engagement with said workpiece to provide for entrainment of the hood means with the workpiece.

6. A machine as set forth in claim 5 wherein said contact member is disposed upstream of the line of cut of said torch, relative to the workpiece feed direction.

7. A machine as set forth in claim 5 wherein said lower edge portion is disposed in a position relative to said torch end portion such that when said hood means is in its said operative position said torch end portion is at the required spacing from the surface of the workpiece.

8. A machine as set forth in claim 1 wherein said hood means includes an upper wall portion having an elongate opening therein extending transversely with respect to the workpiece feed direction, said torch extending through said opening into said hood means.

9. A machine as set forth in claim 8 wherein said opening has a transverse dimension only slightly larger than the corresponding dimension of said torch in its portion which is disposed in said opening.

10. A machine as set forth in claim 8 wherein raised guide means are disposed at the edges of said opening.

11. A machine as set forth in claim 10 wherein the height of said guide means relative to the adjoining surface of said hood means is about five to seven times the width of the opening.

12. A machine as set forth in claim 1 wherein said rotary measuring member is a roller disposed on the downstream side of said support plate and said length measuring means includes a pivotally mounted lever carrying said roller.

13. A machine as set forth in claim 12 and further including rotary members mounted adjacent said measuring roller and rotatable therewith, and means for applying a cooling fluid to said rotary members.

14. A machine as set forth in claim 13 wherein said cooling fluid applying means comprises a bath for containing a cooling fluid into which said rotary members dip.

15. A machine as set forth in claim 1 wherein said hood means forms part of a telescopically interengageable insulating channel system which comprises a fixed shielding structure having side walls adapted to cover said workpiece upstream and downstream of said torch and measuring means assembly and an insulating cover means displaceable with said assembly and co-operable with said shielding structure, thereby forming a channel enclosure for said workpiece.

16. A machine as set forth in claim 1 wherein the hood means has a portion which is removable for inspection purposes.

17. A machine as set forth in claim 1 and including a monitor system for viewing within said hood means, comprising at least one camera having a water-cooled housing and viewing tube extending through said hood means.

18. A machine as set forth in claim 17 and including a respective said camera arranged on each side of said hood means.

19. A machine as set forth in claim 1 comprising a plurality of said torches, and further including a ring conduit means for supplying each gaseous agent to be supplied to the torches, a plurality of supply conduits communicating the respective torches with said ring conduit means, a feed conduit for supplying each said ring conduit means, and a common control means disposed in the feed conduit to each ring conduit means.

20. A machine as set forth in claim 19 and further including high-speed vent valves in said supply conduits.

21. A machine as set forth in claim 20 wherein said valves are disposed at the location where the respective supply conduits join said ring conduit means.

22. A machine as set forth in claim 19 wherein said feed conduits and a control unit are adapted to be mounted selectively on either side of the line of feed movement of a said workpiece through the machine.

23. A machine as set forth in claim 1 and further comprising a double cooling casing having an open intake connecting means for receiving coolant from a coolant feed conduit, an open discharge connecting means for discharge of coolant from the double cooling casing, and means for feeding coolant from said discharge connecting means to said torch to cool same.

24. A machine as set forth in claim 24 and including control cross-section means for controlling the coolant flow, and wherein the coolant-carrying volume within the coolant flow system ensures a minimum reserve of coolant to provide cooling for the machine in the event of a temporary interruption in the coolant feed.

25. A flame machining apparatus for flame cutting of a workpiece, comprising: a workpiece feed means; a support frame structure; a length measuring means supported by said support frame structure and including a rotary measuring member adapted to roll on a surface of a said workpiece moving on said workpiece feed means; upstream of said measuring means, a carrier member mounted for movement towards and away from a said workpiece; means for moving said carrier member towards and away from said workpiece; a hood means carried on said carrier member on the upstream side thereof and movable with said carrier member between a raised position in which said hood means is spaced from a said workpiece and a lowered operative position in which said hood means co-operates with a said workpiece to define an enclosure over the surface of the workpiece; at least one torch having an operative end portion extending into said enclosure, for operating on said workpiece; means mounting said torch movably in a transverse direction with respect to the workpiece feed direction; and means for supplying said torch with operating fluids for operation thereof.

26. Apparatus as set forth in claim 25 and further comprising a carriage which is movable on said support frame structure, said length measuring means, said carrier member with said torch and said hood means carried thereon and said means for moving said carrier member relative to said workpiece being carried by said movable carriage.

* * * * *

UNITED STATES PATENT AND TRADEMARK OFFICE
CERTIFICATE OF CORRECTION

PATENT NO. : 4,475,719
DATED : October 9, 1984
INVENTOR(S) : Horst K. Lotz

It is certified that error appears in the above-identified patent and that said Letters Patent is hereby corrected as shown below:

IN THE ABSTRACT

Line 12 delete "heating" insert --heat--.

Column 4, line 33 delete "1" insert --6--.

Column 4, line 65 after "should" insert --also--.

Column 5, line 52 after "workpiece" insert --1--.

Signed and Sealed this

Thirtieth Day of July 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,475,719

DATED : October 9, 1984

INVENTOR(S) : Horst K. Lotz

It is certified that error appears in the above-identified patent and that said Letters Patent is hereby corrected as shown below:

In the patent heading, Item [73], lines 2-3,
    delete "Federal Republic of Germany" and insert
    -- Zollikerstrasse, Zuerich --.

Signed and Sealed this

Twenty-seventh Day of March, 1990

*Attest:*

JEFFREY M. SAMUELS

*Attesting Officer*    *Acting Commissioner of Patents and Trademarks*